July 24, 1923.

W. G. COX

AUTOMOBILE SHIELD

Filed Jan. 2, 1923

1,462,956

3 Sheets-Sheet 1

Inventor
W. G. COX.

By
Attorneys

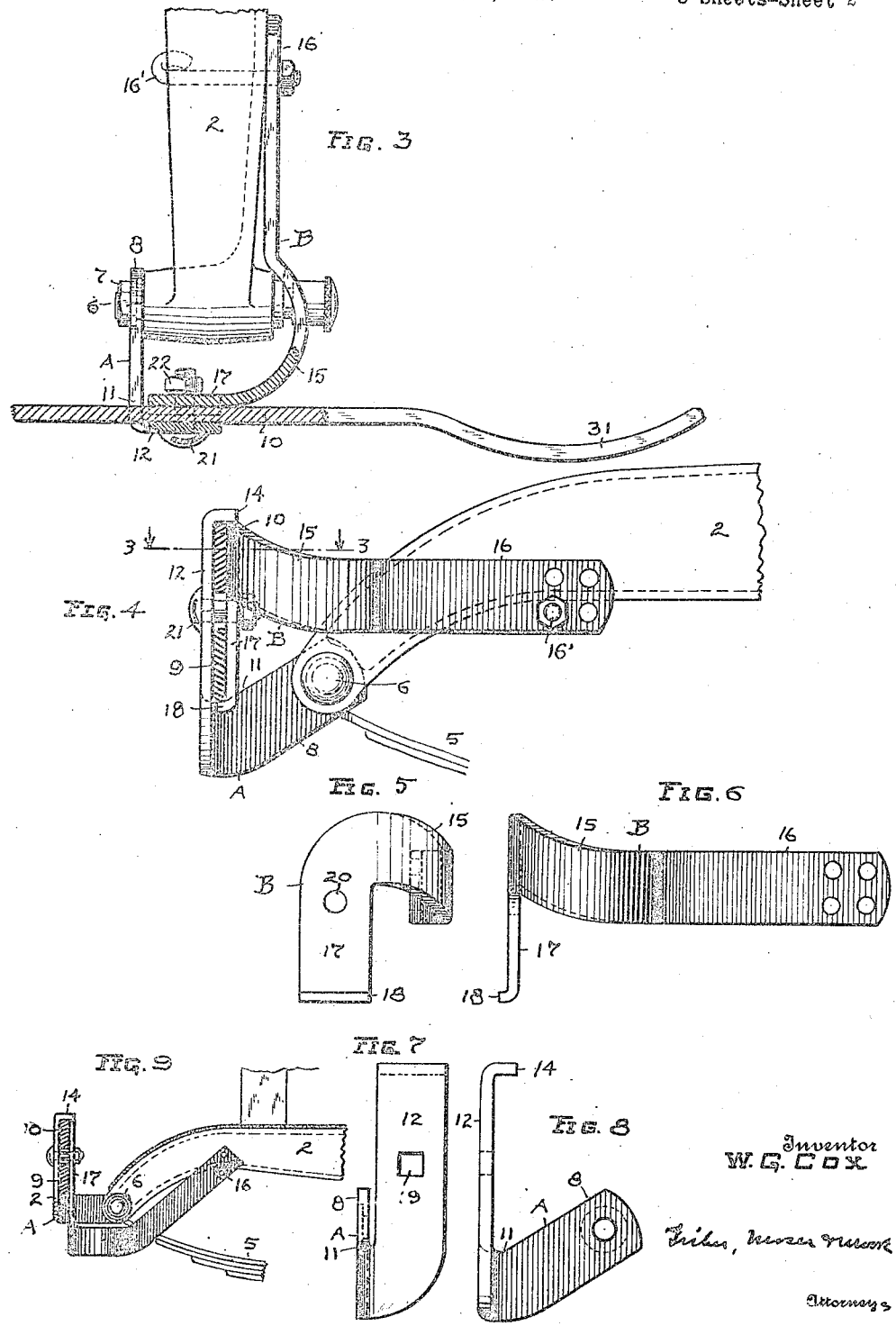

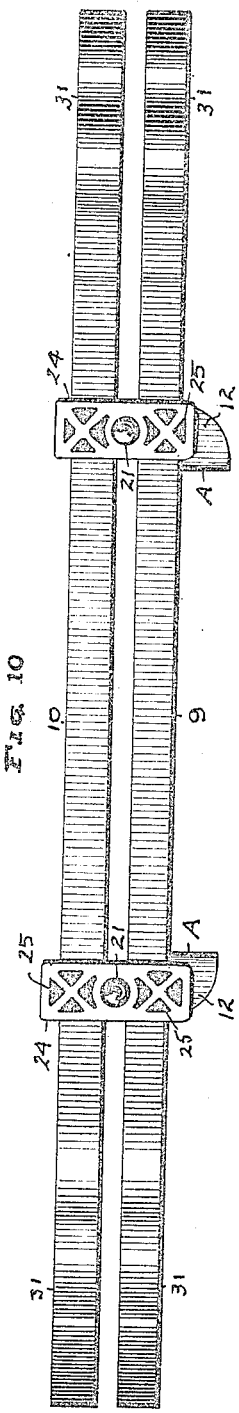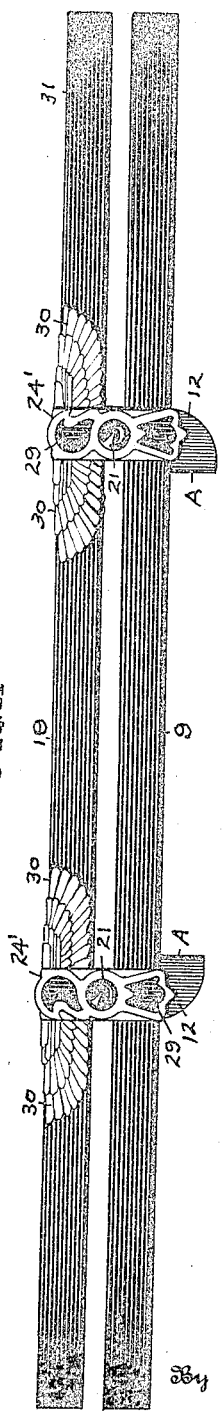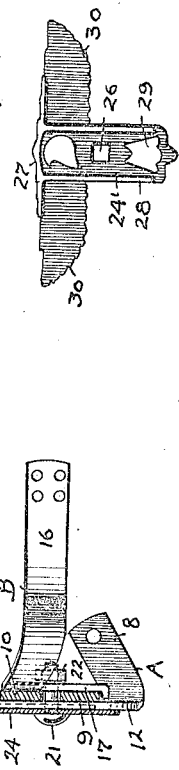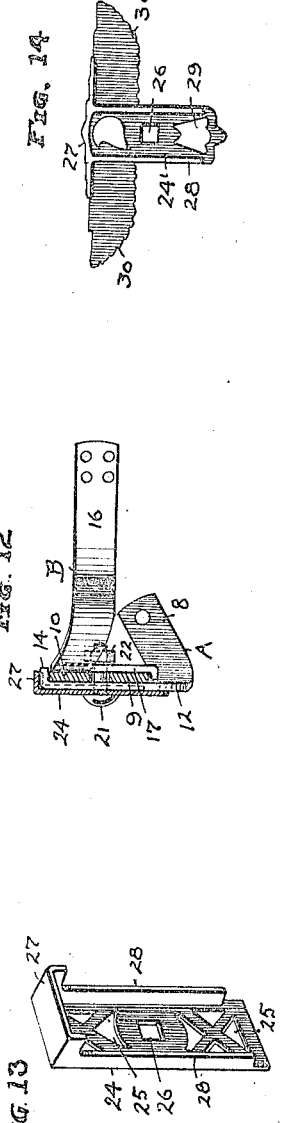

Patented July 24, 1923.

1,462,956

UNITED STATES PATENT OFFICE.

WILLIAM G. COX, OF CLEVELAND, OHIO, ASSIGNOR TO COX BRASS MANUFACTURING COMPANY, OF ALBANY, NEW YORK, A CORPORATION OF NEW YORK.

AUTOMOBILE SHIELD.

Application filed January 2, 1923. Serial No. 610,155.

*To all whom it may concern:*

Be it known that I, WILLIAM G. COX, a citizen of the United States, residing at Cleveland, in the county of Cuyahoga and State of Ohio, have invented certain new and useful Improvements in an Automobile Shield, of which the following is a specification.

The present invention relates to that class of protecting devices which are mounted transversely upon the projecting end of an automobile and which comprise buffer or fender bars adapted to receive the brunt of any blow or collision and by that means prevent or minimize the damage to the more vulnerable parts of the car, such as the radiator, lamps, mud guards, gasoline tanks, and the highly finished body.

Generally the buffers in common use are mounted or constructed to project a considerable distance beyond the end of the car and this distance is greatly augmented in nearly every instance where resilient members are utilized or embodied in the buffers so that they may yield under pressure of contact. However, the congestion of automobile traffic and the crowded parking conditions in large cities militate against the use of prominent or jutting end projecting devices and many persons are opposed to equipping their cars with such devices because they create difficulties in maneuvering and in parking a car and because of the damage these jutting parts are likely to impart to other vehicles closely parked or where travel is congested. I have therefore devised an efficient protecting device which may be set closely to the car ends and only project to a minimum extent beyond the end parts of the automobile; and this device comprises parallel guard rails or bars to provide a relatively high or broad face vertically but a thin body which will not take up much space horizontally beyond the end of the car, and the extremities of the guard rails or bars of this device are curved outwardly opposite the tires and mud-guards or fenders of the car to permit a relatively close setting of the device to such parts and to the frame. The mounting of parallel protecting bars at the proper elevation closely in front of the frame and in a strongly buttressed position is also effected in a simple way, as hereinafter shown and described, and the mountings are also constructed and devised with a view of facilitating the attachment of interchangeable re-enforcement or finishing members of ornamental design whereby the protecting device may be embellished and made exceedingly attractive and become an adornment to the vehicle.

Figure 1:
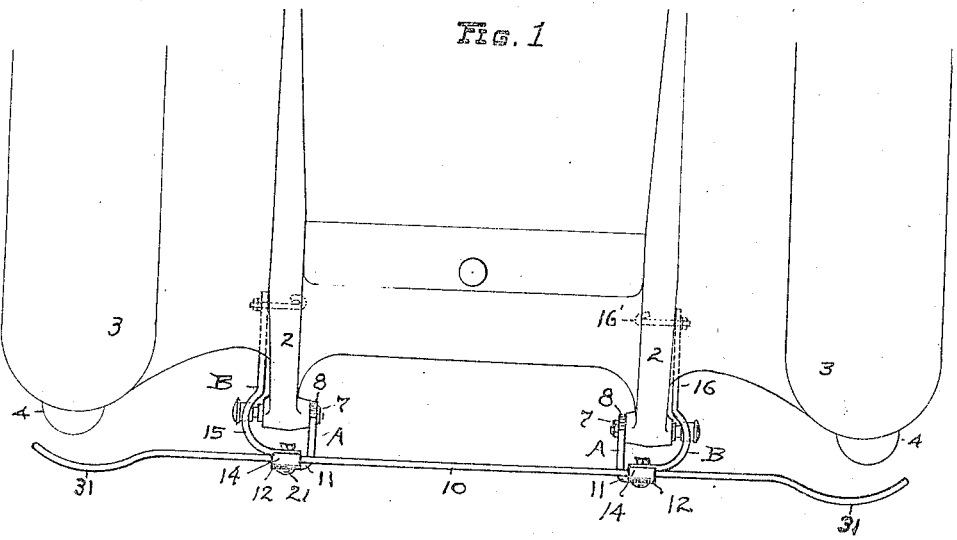
Figure 2:
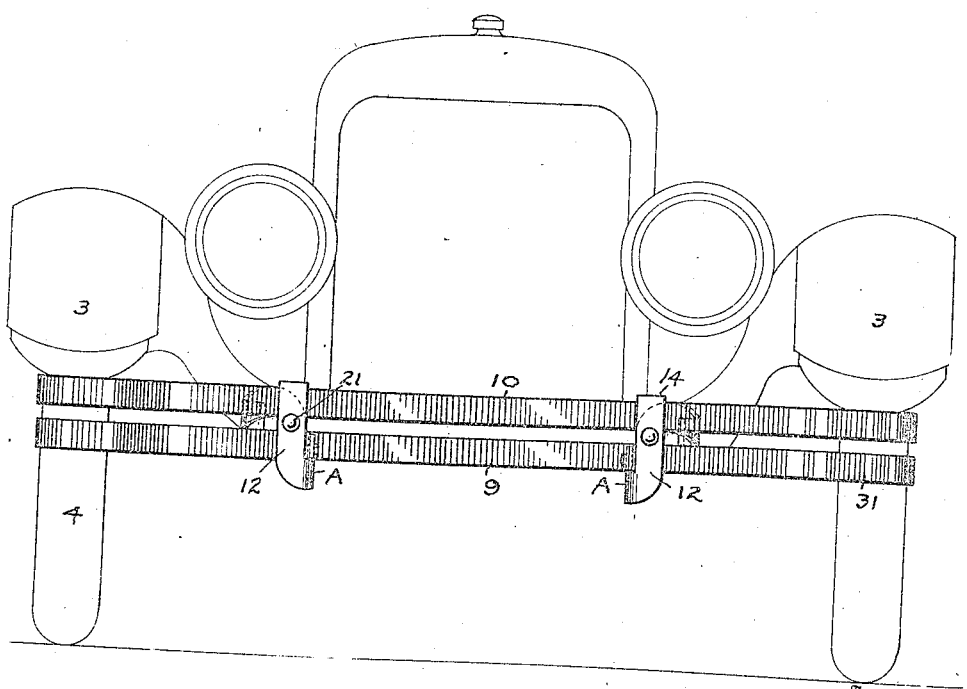

In the annexed drawings, Fig. 1 is a top view of an end portion of an automobile showing my improved protecting device mounted thereon, and Fig. 2 is a front elevation of the same parts. Fig. 3 is an enlarged top view of one end extension of an automobile frame and a part of the protecting device mounted thereon, portions thereof being in section horizontally on line 3—3 of Fig. 4. Fig. 4 is a vertical section and side elevation of the parts shown in Fig. 3. Figs. 5 and 6 are side and end views, respectively, of one of the clamping members for the two guard rails, and Figs. 7 and 8 are similar views of the other clamping member which is used in association therewith. Fig. 9 is a reduced view corresponding to Fig. 4 but showing a modification of the mounting and clamping members. Fig. 10 is a front elevation of the same protecting device shown in Fig. 2 but with a pair of ornamental re-enforcement and finishing plates secured upon the front clamping members by the same clamping bolts. Fig. 11 is a similar view to Fig. 10 but showing a modified form of decoration and finishing plate. Fig. 12 is a reduced view similar to Fig. 4, but showing the finishing plate in section and as clamped thereto by the single bolt. Fig. 13 is a perspective view of the rear side of the finishing cap or plate illustrated in Fig. 10, and Fig. 14 is a rear elevation of the finishing cap or plate illustrated in Fig. 11.

Automobiles as generally constructed embody channeled side members having downwardly-curved end portions 2, and the mud guards or fenders 3 for the wheels 4 extend forwardly approximately the same distance as these curved ends, especially at the front end of the vehicle. The front suspension springs 5 for the vehicle are connected to the curved ends 2 by shackle bolts 6, the nuts 7 for said bolts being located upon the inner sides thereof. The curvature and shape of the frame ends 2 differ depending largely upon the distance the chassis frame is supported from the ground but the shackle bolts 6 are placed about the same distance from the ground in most makes of cars. It being desirable to mount the protecting devices on such cars at uniform elevations, I therefore provide a two part attachment member adapted to be connected with shackle bolt 6, one of the parts A having an inclined upwardly-extending arm 8 for that purpose whereby the bottom guard rail or bar 9 of a shield or guard composed of two or more parallel rails or bars may be supported horizontally opposite shackle bolt 6 upon the upper edge 11 of said arm at its base where bent laterally and thence upwardly to provide a flat vertical clamping extension 12 rising to a considerable distance above the horizontal plane of the shackle bolt but opposite and in front of curved frame end 2. As exemplified in the drawings two flat bars 9 and 10 are clamped in spaced parallel relation one above the other against the posterior face of vertical extension 12 and the upper extremity of this extension is bent rearwardly at right angles to provide a covering stop lip or flange 14 for the top edge of upper bar 10 and also the top edge of the rear clamping member B which has a curved arm 15 terminating in a straight end 16 which extends horizontally toward the rear to permit attachment to be made to the outer side of frame end 2, using a hook bolt 16' or other fastening device for that purpose. Member B is bent downwardly edgewise at its curved end to provide a relatively long and flat clamping extension 17 rearwardly and parallelly opposite vertical extension 12 on member A, and a lip or flange 18 is formed at the lower end of rear extension 17 to extend underneath the bottom edge of the lower rail or bar 9. The opposed clamping extensions 12 and 17 have square and round openings 19 and 20, respectively, approximately midway between their opposite ends, and a single clamping bolt 21 passes between the two bars 9 and 10 and through these openings when the two extensions are vertically aligned and the openings are in register. A lock washer and nut 22 engage the bolt at the rear side of clamping extension 17, thus making a very simple and efficient separable mounting for a pair of bumper rails or bars, whether made of metal or wood. Two such mountings are required, one for each curved extension 2, of the chassis frame, as appears in Figs. 1 and 2, where the vertical clamping extensions 12 of members A are plainly exposed to view in front of the parallel rails or bars. I, therefore, utilize these extensions and also bolts 21 to secure a pair of finishing caps or plates 24 rigidly in spaced relation at the front side of the parallel bars, thus permitting the protecting shield or guard to be embellished or ornamented in a facile and practical way without much expense and permitting an endless variety of designs and decorative combinations to be utilized, inasmuch as these ornamental caps or plates are interchangeable. Moreover, the finishing plates 24 may be formed with openings 25 or an openwork design to expose the front face of the upright extensions 12 which may be finished or painted to produce contrasting color effects. Thus, in Fig. 10 the finishing plate 24 has an openwork Maltese cross formed therein above and below a central square opening 26 for bolt 21, and the face of upright part 12 is represented in Fig. 10 as painted black to produce a pleasing contrast to the bright face of the plate.

This plate also has an overhanging flange 27 at its top and rearwardly-extending side flanges 28 which fit and conceal the edges of the upright part 12 of member A and also hold the plate from displacement in co-operation with the single bolt 21 at the center of the plate. In Fig. 11, a similarly flanged plate 24' is shown having decorative openings 29 within its central face and in addition the plate is provided with lateral flanges 30 adapted to lie flat against the front side of upper rail 10 to re-enforce the same at each side edge of the supporting upright parts of the mountings. In the present instance the lateral flanges 30 are shown in the form of a pair of spreading wings to embellish and give a distinctive and pleasing appearance to the protecting device as a whole, and by using a pair of such decorative plates spaced apart on a pair of relatively long rails or bars a symmetry and balance in design is effected. The face of each upright 12 may also be painted red or in a brilliant color to heighten the effect or carry out any desired color combination in harmony with the body finish of the car. A distinctive appearance is also given to the shield viewed as a whole by swelling the opposite end portions 31 of rails 9 and 10 forwardly on curved lines. However, these swells are primarily formed to permit the buffer rails to be brought relatively close or near to the wheel tire and also to the frame ends 2, and their ornamental effect is a secondary consideration.

What I claim, is:

1. A protecting shield for an automobile, comprising a plurality of buffer rails, and separate sets of paired attachment arms adapted to be clamped upon opposite sides of the projecting side ends of an automobile frame, each pair of said arms having upright clamping extensions adapted to clamp a plurality of buffer rails parallelly therebetween and transversely opposite the end of the automobile.

2. A protecting shield for the end of an automobile, comprising a plurality of buffer bars, and separate sets of attachment members each set having a front clamping member and a rear clamping member for said bars, each clamping member having an integral arm extending rearwardly to permit independent attachment thereof with a fixed part of the automobile.

3. A protecting shield for the end of an automobile, comprising a plurality of parallel buffer bars and two sets of attachment arms, each set having one arm provided with a vertical clamping extension for the rear sides of said bars and a second arm provided with an integral vertical clamping extension for the front side of said bars.

4. A protecting shield for an automobile, comprising a plurality of buffer bars, two attachment arms having integral downwardly-extending clamping portions to permit clamping engagement with one side of said bars, two attachment arms having integral upwardly-extending clamping portions to permit clamping engagement with the other side of said bars, and means to effect a clamping union between said parts.

5. A protecting shield for an automobile, comprising a plurality of buffer bars, and duplicate pairs of attachment members, each pair made of two bars, one bent downwardly and the other upwardly, to provide overlapping vertical extensions adapted to support said buffer bars parallelly one above the other and the main body portions of said attachment bars extending rearwardly in spaced relation to permit separate attachment to the opposite sides of the side bar of the automobile.

6. A protecting shield for an automobile, comprising a plurality of buffer bars, separate sets of attachment members formed of separable parts having opposing clamping portions to secure said bars parallelly one above the other, one of said parts in each set having a rearwardly extending arm to permit its attachment to one side member of the frame of the automobile and the other of said parts in each set having an arm to permit its attachment to a suspension spring shackle bolt of the automobile.

7. A protecting shield for an automobile, comprising a mounting for a buffer member made of two separable parts, one of said parts having a horizontal attachment arm provided with a vertically-extending spring clamping portion at its front end and the other of said parts having an upwardly-inclined attachment arm provided with a vertically-extending spring clamping portion opposed to said other clamping portion, and means to unite said parts in clamping union with each other and a buffer member.

8. A protecting shield for an automobile, comprising a buffer member, and separate mountings for said buffer member made of independent parts, each part having a horizontally-extending attachment arm and a vertically-extending spring clamping portion provided with an end lip and a clamping bolt.

9. A protecting shield for an automobile, comprising a plurality of buffer bars, and separated mountings therefor having vertical clamping portions at the front of said bars, and a decorative plate detachably affixed to and reenforcing the front of each clamping portion.

10. A protecting shield for an automobile, comprising parallel buffer bars, a pair of spaced mountings for said bars having vertical clamping arms, a decorative plate having border flanges adapted to overlap the edges of said arms, and a common clamping device for said plate and bars.

11. A protecting shield for an automobile, comprising parallel buffer bars, attachment members having vertical supporting extensions for said bars, and a reenforcing decorative face plate flanged at its edges to enclose each extension at the front side of said bars, said plates having openings therein exposing the front side of said extensions.

12. A protecting shield for an automobile, comprising a buffer member, separated mountings for said member, and a decorative plate for each mounting having lateral reenforcing extensions overlapping said buffer member at each side of the mounting.

13. A protecting shield for an automobile comprising a plurality of horizontally and vertically spaced buffer bars and attaching devices therefor each comprising two spaced arms having vertical overlapping extensions which serve to clamp the said buffer bars together and also to secure the said shield to one of the side bars of the automobile.

14. A bumper-clamp for an automobile comprising a pair of separable members, one having a transverse clamping face for the front side and the other a corresponding clamping face for the rear side of a plural number of transverse bumper bars and each member having a longitudinal clamping face for engaging the automobile frame.

In testimony whereof, I affix my signature hereto.

WILLIAM G. COX.